Dec. 9, 1930.  A. SWANBAUM  1,784,318
WIRE TWISTING APPARATUS
Filed Feb. 14, 1929
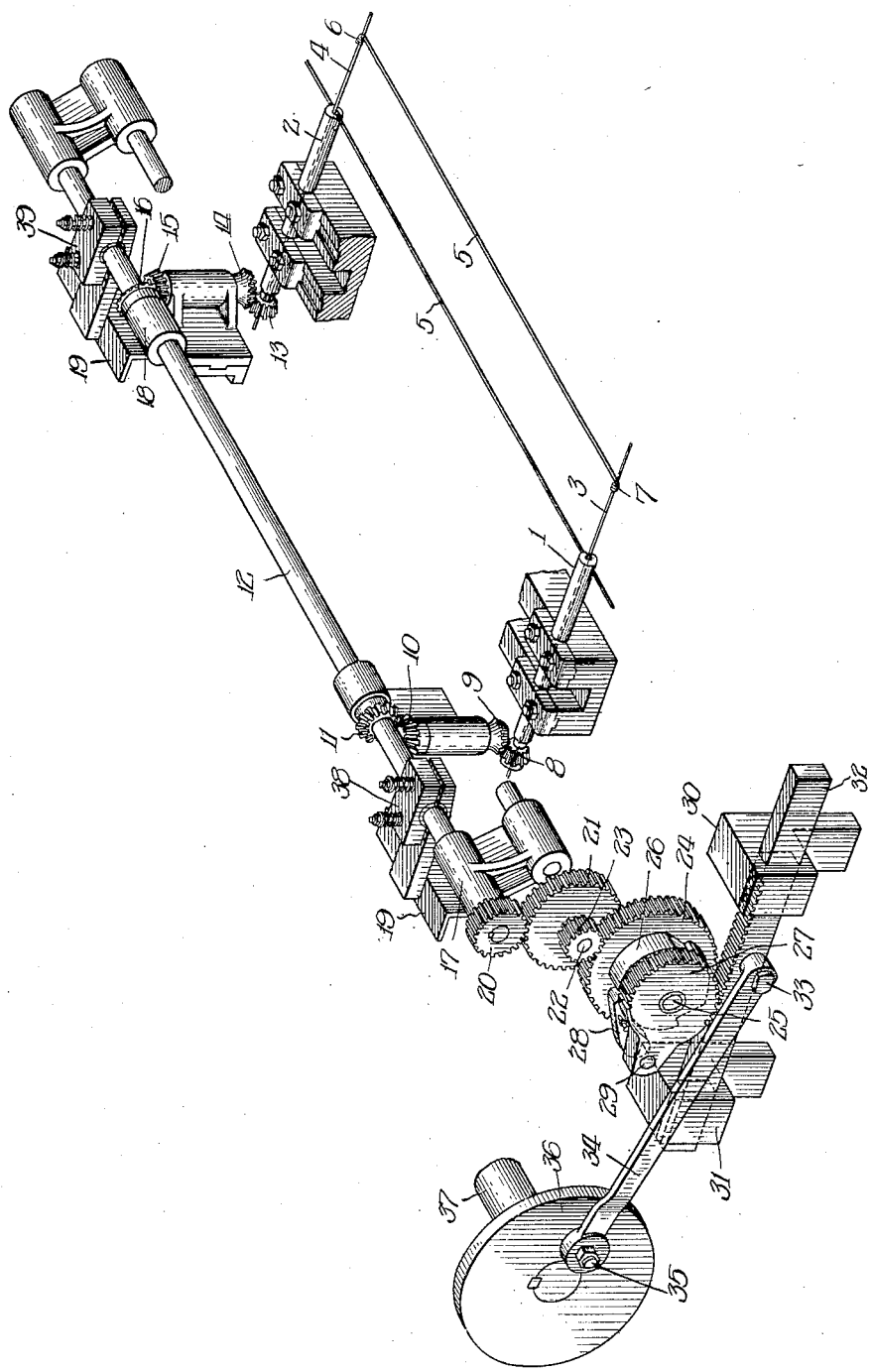
Inventor:
Albert Swanbaum, Patented Dec. 9, 1930

1,784,318

UNITED STATES PATENT OFFICE

ALBERT SWANBAUM, OF DULUTH, MINNESOTA

WIRE-TWISTING APPARATUS

Application filed February 14, 1929. Serial No. 339,835.

This invention relates to improvements in fence making machinery and particularly to improvements in drive mechanism for the twister heads. In machines of this type twister heads are provided through which the upper and lower strands of the fence wire are fed and which cooperate with the cross strands to twist the ends thereof and secure them to the upper and lower strands. It is necessary to provide drive mechanism which will intermittently rotate the twister heads through a predetermined distance and stop them in definite positions.

In a prior construction a drive from a continuously rotating power shaft has been changed by a pawl and ratchet device to an intermittent rotation of a spindle shaft which is geared to the twister heads. In such construction the connection between the continuously rotating crank disc on the power shaft and the pawl for operating the ratchet has consisted of a jointed connecting rod but it has been found that such connection causes a jerking motion and results in excessive lost motion. Furthermore, it has been necessary to use a pair of brakes on the spindle shaft in order to stop the twister heads in correct position to receive the next picket wire.

It is the purpose of my invention to provide an improved drive means which will connect the continuously rotating power shaft to the pawl and ratchet device by smoothly operating parts whereby the jerky motion is eliminated and the possibility of overrun is decreased allowing the tightness of the brakes on the spindle shaft to be lessened and resulting in an increased speed and efficient operation of the machine.

It is an object of my invention to connect the pawl to a pinion gear which is in engagement with a slidable rack operated by a single connecting rod from the crank disc on the power shaft.

Further objects and advantages of my improved construction will be more readily apparent as the invention is more fully described in connection with the attached drawings in which—

The single figure is a perspective view of a portion of the fence making machine and the drive mechanism for operating the twister heads.

In the drawings I show a pair of twister heads 1 and 2 through which the upper and lower strands 3 and 4 of the wire fence are intermittently fed. Cross picket wires 5 are secured to the upper and lower strands 3 and 4 by twisted ends 6 and 7. The twisted ends 6 and 7 are formed by the rotation of the twister heads 1 and 2. A bevel gear 8 is secured to an extension of the twister head 1 and meshes with a bevel gear 9 which is rotated together with bevel gear 10, meshing with bevel gear 11, secured to a transverse spindle shaft 12. The twister head 2 is similarly driven through bevel gears 13, 14, 15 and 16 from the spindle shaft 12. The spindle shaft 12 is journalled in bearings 17 and 18 secured to brackets 19 which may form a part of the frame of the machine. At one end of the spindle shaft 12 is keyed a pinion gear 20, which meshes with a gear 21, keyed to a countershaft 22; also secured to countershaft 22 is a pinion gear 23 meshing with gear 24 on an intermediate shaft 25. Upon the shaft 25 is mounted a three-tooth ratchet 26 and an outside pinion gear 27. A pivoted pawl 28 is adapted to engage the ratchet 26, the pawl being mounted on pivot pin 29 which is held by an extension from the pinion gear 27. Suitable guide brackets 30 and 31 are provided for a rack gear 32. On the rack 32 is mounted a pivot pin 33 to which a connecting rod 34 is pivoted. The connecting rod 34 is also secured by pivot pin 35 to a crank disc 36 which is keyed to the power shaft 37. I also show spring-pressed brakes 38 and 39 frictionally engaging the spindle shaft 12.

In the operation of my drive mechanism it is apparent that the continuous rotation of the crank disc will cause alternate reciprocation of the crank gear 32 in opposite directions through the movement of connecting rod 34. The rack 32 during its alternate reciprocation will cause an alternate and opposite rotation of the pinion 27 and, therefore, cause the pawl 28 to intermittently engage the ratchet 26 and feed the spindle shaft 12 through the intermediate gearing. Therefore, the twister heads 1 and 2 will be given a positive intermittent rotation through a definite and predetermined distance. The provision of the slidable rack eliminates the possibility of a jerky motion previously caused by the formerly-used two-part connecting rod. The tightness of the brakes 38 and 39 may therefore be lessened and the speed of the machine may be increased at the same time allowing a smooth and efficient operation.

I claim:

1. A wire twisting apparatus comprising, in combination, a plurality of twister heads constructed and arranged for intermediate rotation in the same direction, rotary means for driving the twister heads, and means connecting the rotary means with the twister heads, said connecting means comprising a device for changing the movement of the rotary means to alternate and opposite reciprocations in a lineal path, and a device for changing such reciprocations to intermittent rotation in one direction.

2. A wire twisting apparatus comprising, in combination, a plurality of twister heads constructed and arranged for intermediate rotation in the same direction, rotary means for driving the twister heads, and means connecting the rotary means with the twister heads, said connecting means comprising a device for changing the movement of the rotary means to alternate and opposite reciprocations in a lineal path, and a device for changing such reciprocations to alternate and opposite rotation, together with a device for changing such rotation to intermittent rotation in one direction.

3. A wire twisting apparatus comprising, in combination, a plurality of twister heads, a continuously rotating crank wheel for imparting movement to the twister heads, a slidable rack, a connecting rod from the crank wheel to the slidable rack, a pinion meshing with the rack, a pawl operated by the pinion, a ratchet intermittently operated by the pawl, and a spindle shaft geared to the twister heads and intermittently turned through the operation of the ratchet.

4. A wire twisting apparatus comprising, in combination, a plurality of twister heads, means for intermittently turning the twister heads a definite and pre-determined distance in the same direction, said means comprising a crank wheel, a slidable member alternately moved in opposite directions in a linear path, said slidable member being actuated from said crank wheel, a spindle shaft intermittently turned in one direction by the movement of the slidable member, said spindle shaft being geared to the plurality of twister heads.

5. A wire twisting apparatus comprising, in combination, a spindle shaft, means for intermittently turning said shaft a definite and pre-determined distance, said means comprising a crank wheel, a slidable member alternately moved in opposite directions in a linear path, said slidable member being actuated from said crank wheel, means operatively connecting the slidable member to the spindle shaft whereby said shaft is intermittently turned in one direction by movement of the slidable member in opposite directions, and a plurality of twister heads connected to the spindle shaft and adapted to be intermittently rotated thereby.

Signed at Duluth, Minnesota, this 8th day of February, 1929.

ALBERT SWANBAUM